US007332091B2

(12) United States Patent
Peters, Jr. et al.

(10) Patent No.: US 7,332,091 B2
(45) Date of Patent: Feb. 19, 2008

(54) PROCESS FOR TREATING STORM WATER

(76) Inventors: John Peters, Jr., 37 Florence Dr., Manorville, NY (US) 11949; John Markee, 18 Wyeth St., Selden, NY (US) 11784

( * ) Notice: Subject to any disclaimer, the term of this patent is extended or adjusted under 35 U.S.C. 154(b) by 259 days.

(21) Appl. No.: 11/015,233

(22) Filed: Dec. 17, 2004

(65) Prior Publication Data

US 2005/0279709 A1    Dec. 22, 2005

Related U.S. Application Data

(63) Continuation-in-part of application No. 10/430,170, filed on May 5, 2003, now abandoned.

(60) Provisional application No. 60/530,164, filed on Dec. 17, 2003.

(51) Int. Cl.
*C02F 1/28* (2006.01)

(52) U.S. Cl. ..................... 210/690; 210/691; 210/692; 210/693; 210/694

(58) Field of Classification Search ......... 210/690–694
See application file for complete search history.

(56) References Cited

U.S. PATENT DOCUMENTS

| | | | | |
|---|---|---|---|---|
| 5,264,134 | A | * | 11/1993 | McCamy ..................... 210/679 |
| 5,364,535 | A | * | 11/1994 | Buckalew ..................... 210/671 |
| 5,622,630 | A | | 4/1997 | Romano |
| 5,707,527 | A | | 1/1998 | Knutson et al. |
| 5,744,048 | A | | 4/1998 | Stetler |
| 5,820,762 | A | * | 10/1998 | Bamer et al. ............... 210/661 |
| 5,849,198 | A | * | 12/1998 | Sharpless ..................... 210/693 |
| 5,954,952 | A | | 9/1999 | Strawser, Sr. |
| 6,027,639 | A | | 2/2000 | Lenhart, Jr. et al. |
| 6,059,964 | A | | 5/2000 | Strawser, Sr. |
| 6,080,307 | A | | 6/2000 | Morris et al. |
| 6,099,723 | A | | 8/2000 | Morris et al. |
| 6,106,707 | A | | 8/2000 | Morris et al. |
| 6,231,758 | B1 | | 5/2001 | Morris et al. |
| 6,241,889 | B1 | | 6/2001 | Haley, III |
| 6,251,269 | B1 | * | 6/2001 | Johnson et al. ......... 210/170.07 |

(Continued)

FOREIGN PATENT DOCUMENTS

WO      WO 9214005 A1 *  8/1992

*Primary Examiner*—Chester T. Barry
(74) *Attorney, Agent, or Firm*—Knoble, Yoshida & Dunleavy, LLC (57) ABSTRACT

An insert for a storm water treatment system includes an elongated baffle member that is configured to be mounted within a substantially upright storm water drain basin so as to separate the interior space of the drain basin into a first compartment that communicates with an inlet opening of the drain basin and a second compartment that communicates with an outlet opening of the drain basin. A predetermined primary flow path is defined in the baffle number between the first and second compartments near a lower end of the baffle member. Treatment material is positioned, optionally in cartridge form, in a lower end of the second compartment so that storm water in the primary flow path will be directed through the treatment material in order to remediate possible contamination of the storm water. The system is designed in order to facilitate retrofitting of existing storm water drainage infrastructure and for original installation. A method of treating storm water is also disclosed.

6 Claims, 6 Drawing Sheets

U.S. PATENT DOCUMENTS 6,277,274 B1    8/2001    Coffman
6,350,374 B1    2/2002    Stever et al.
6,447,686 B1    9/2002    Choi et al.
2002/0057944 A1*    5/2002    Adams et al. ................ 405/39
2003/0034286 A1*    2/2003    Butler ........................ 210/163

* cited by examiner

PROCESS FOR TREATING STORM WATER

This application claims priority under 35 USC §119(e) based on U.S. Provisional Application Ser. No. 60/530,164, which was filed on Dec. 17, 2003 and is further a Continuation-in-part of U.S. patent application Ser. No. 10/430,170, filed May 5, 2003 now abandoned. The entire disclosures of both of the aforementioned documents are hereby incorporated by reference as if they were set forth fully herein.

BACKGROUND OF THE INVENTION

1. Field of the Invention

This invention relates generally to the field of environmental remediation of storm water. More specifically, this invention relates to an improved system and process for treating storm water in situ within conventional civil drainage infrastructure such as a drain basin.

2. Description of the Related Technology

Storm water that is created by storm runoff in heavily developed areas is typically channeled into storm drainage systems that eventually drain into nearby streams, creeks, rivers or other bodies of water. Unfortunately, paved surfaces that bear automobile traffic typically become coated with significant pollutants such as heavy metals and volatile organic compounds, both under normal traffic conditions and in particular when motor vehicle accidents occur. When normal rain or snowfall occurs, these pollutants tend to be swept away with the runoff storm water and eventually lead to contamination of the bodies of water that eventually receive them. Such contamination has become a significant environmental issue in many areas. In addition, a significant amount of debris such as bottles and cans tends to be swept away by storm water runoff.

Many storm water drainage systems include underground conduits that are typically junctioned together by substantially vertical cylindrical containers that are typically referred to as drain basins. One commercially common drain basin is the Nyloplast™ drain basin that is manufactured by Advanced Drainage Systems, Inc. of Columbus, Ohio. For purposes of this document, a drain basin is defined as a substantially upright container for holding storm water that includes at least one inlet opening and at least one outlet opening defined in its sidewall.

Systems exist for filtering storm water runoff that are effective in removing debris from storm water and in removing certain other pollutants, such as hydrocarbons. For example, U.S. Pat. No. 6,080,307 discloses a storm drain insert that contains one basket for the collection of debris as well as a canister that contains a hydrophobic, compliant, oil-absorbent copolymer material that is said to be effective in removing oil from the storm water.

Unfortunately, prior to this invention no system or process has been developed that is capable of removing heavy metals from storm water in situ within a storm water drainage system, and particularly for use within a drain basin. Technology exists for removing heavy metals from storm water within complex storm water treatment facilities, but not locally within storm water drainage systems where such treatment facilities are not present.

A need exists for an improved system and process for processing storm water that is effective in removing heavy metals, as well as hydrocarbons and other volatile organic compounds, from the storm water in situ within a storm water drainage system.

SUMMARY OF THE INVENTION

Accordingly, it is an object of the invention to provide an improved system and process for processing storm water that is effective in removing heavy metals, as well as hydrocarbons and other volatile organic compounds, from the storm water in situ within a storm water drainage system.

In order to achieve the above and other objects of the invention, a method of processing storm water according to a first aspect of the invention includes accessing a drain basin that is part of a storm water runoff system; and positioning a treatment system within the drain basin that is constructed and arranged to remediate contamination of storm water within the drain basin.

According to a second aspect of the invention, a storm water treatment insert for use in a storm water drain basin that is a substantially upright container having a sidewall, an inlet opening defined in the sidewall for admitting storm water and an outlet opening defined in the sidewall for discharging storm water includes a baffle member for separating space within the drain basin into a first compartment that is in communication with the inlet opening of the drain basin and a second compartment that is in communication with the outlet opening of the drain basin, the baffle member defining a predetermined primary flow path from the first compartment to the second compartment; and mounting structure for mounting the baffle number in a substantially fixed position with respect to the drain basin.

A modular, replaceable cartridge for use in a storm water treatment system according to a third aspect of the invention includes an outer casing having a plurality of perforations defined therein, the outer casing having a predetermined external shape that is constructed and arranged to be mounted within a compatible storm water treatment system; and a treatment material for remediating contamination of storm water, the treatment material being contained within the outer casing.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
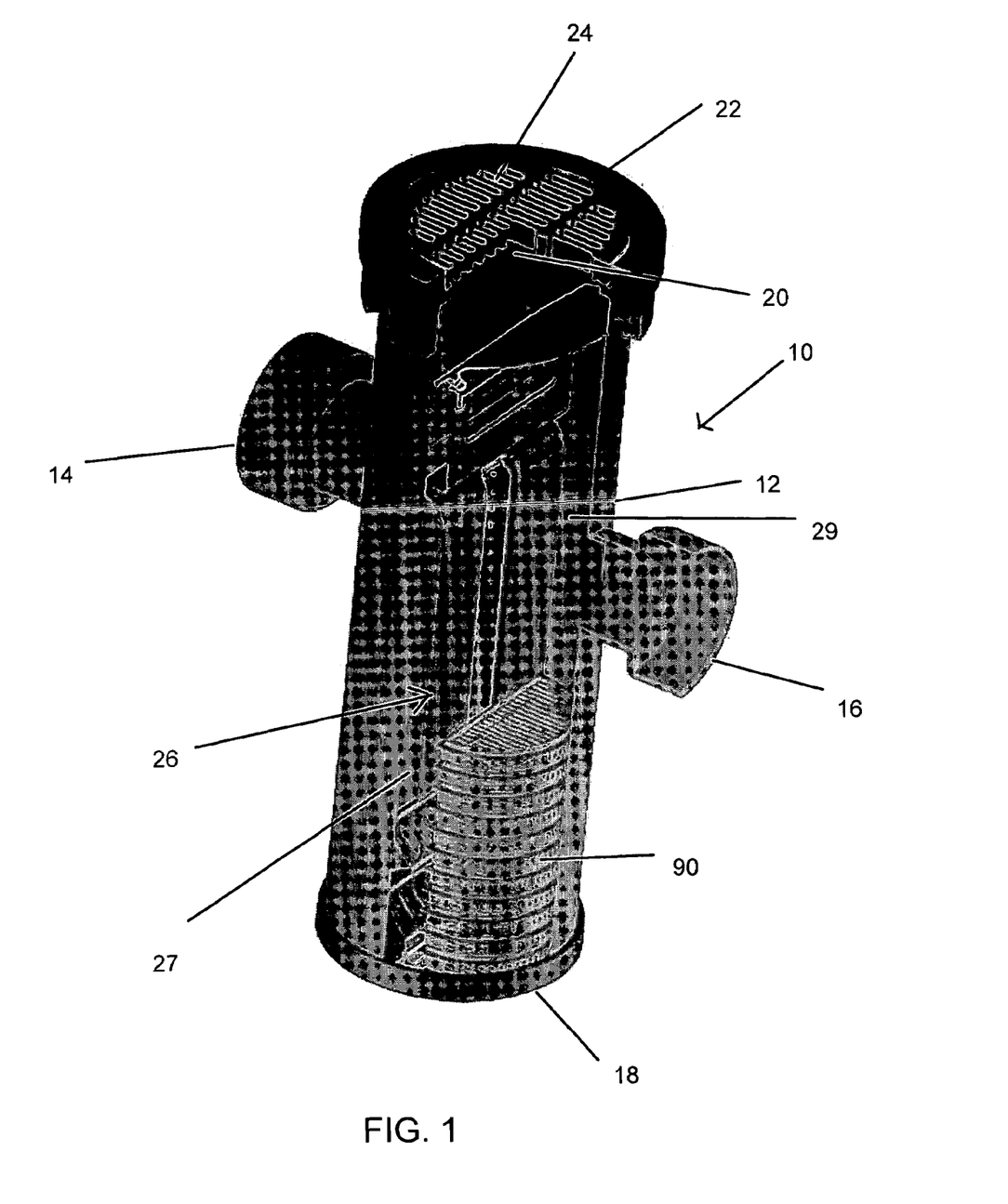
FIG. 1 is a fragmentary depiction of a storm water treatment insert that is constructed according to a preferred embodiment of the invention, shown in situ within a storm water drain basin.

Referring now to the drawings, wherein like reference numerals designate corresponding structure throughout the views, and referring in particular to FIG. 1, a conventional storm water drain basin 10 includes a generally cylindrical sidewall 12 that is oriented so as to be substantially upright or vertical and includes an inlet 14 defined in the cylindrical sidewall 12 for admitting storm water into the drain basin 10 and an outlet 16 for permitting storm water to escape from the drain basin 10. Drain basin 10 further includes a sealed bottom 18 and an open, upper end 22 which a removable cover 22 is mounted. In the illustrated embodiment, cover 22 includes a perforated grate 24 that is configured to permit storm water to enter the open upper end 20 of the storm water drain basin 10. Alternatively, a system constructed according to the invention would be equally operable in use with a drain basin that has a sealed upper end or an upper end that is secured by a closed cover.

According to one particularly advantageous aspect of the invention, a storm water treatment insert 26 may be installed within the drain basin 10 as is depicted in FIG. 1 so as to effectively separate or partition the interior space of the storm water drain basin 10 into at least a first compartment 27 that is communicated with the inlet 14 and a second compartment 29 that is communicated with the outlet 16. Treatment material 31 is preferably provided within the second compartment 29 that is capable of absorbing heavy metals from storm water.

In the preferred embodiment of the invention, treatment material 31 is preferably positioned within the second compartment 29 within a plurality of stackable modular treatment cartridges 90, the details of which will be described in greater detail below. Different types of treatment material 31 may be provided within a single cartridge 90 or each cartridge 90 may be filled with a different kind of treatment material 31.

One type of treatment material 31 that is intended for use with the preferred embodiment of the invention has a preferred active ingredient that is a zeolite that has an ion exchange capacity. Zeolite is a porous crystal material composed mainly an aluminum and silicon with other minerals such as potassium, calcium and sodium, which are used as exchangeable cations. The individual crystals bond together in long chains creating a lattice type network of interconnected cavities, pores and open spaces which provide sites for cation exchange and adsorption. As a filtering media, zeolite will draw liquid runoff into its crystal structure where it is adsorbed onto the large surface areas. Suspended solids are effectively removed, and become physically entrapped or encapsulated within these cavities and pores. The zeolite effectively may function as a filter bed as well as a process material for cation exchange and adsorption. Toxic metal ions in the liquid displace the calcium, sodium or potassium cations in the passageways and become strongly bonded to the numerous exchange sites. The extreme molecular complexity also significantly reduces the external surface area, which further limits the potential mobility of the contaminants to leach back into the environment.

Each zeolite mineral has a distinct ion exchange selectivity and capacity. This process occurs when water molecules can pass through the channels and pores allowing cations present in the solution to be exchanged for cations in the structure. Several factors must be considered in this process. These include solution strength, pH, temperature and the presence of other competing cations in the solution. These factors can affect both the ion exchange selectivity and capacity of the specific zeolite mineral. Chabazite and Clinoptilolite are two of the minerals in the zeolite group that possess superior ion exchange capability. Chabazite is the preferred zeolite material for use in the preferred embodiment of the invention. However, the invention may be practiced using any treatment material, zeolite or otherwise, that is capable of absorbing heavy metals from storm water. This includes zeolites or other materials that have been chemically enhanced to increase their cation exchange capacity.

Another type of treatment material 31 according to the invention is an anti-microbial treatment material, which is commercially marketed as the AEGIS shield by AEGIS Environments of Midland, Mich. The AEGIS shield is a unique chemical technology that can be applied to a material making it Antimicrobially active. The AEGIS Microbe Shield technology permanently bonds (polymerizes) with the substrate and will not leach or diminish overtime. The technology relies on the coating remaining affixed to the substrate—killing microorganisms as they contact the treated surface. The AEGIS Microbe Shield is a reactive silane quaternary ammonium compound. When applied as a liquid to a host filter material the active ingredient in the AEGIS Antimicrobial forms a colorless, odorless, positively charge polymer coating which chemically bonds, virtually irremovable, to the treated surface. When a microorganism comes in contact with the treated surface, the sword punctures the cell membrane and the electrical charge shocks the cell. Since nothing is transferred to the now dead cell, the Antimicrobial doesn't lose strength the sword is ready for the next cell to contact it.

Another type of treatment material 31 according to the invention is designed to remove hydrocarbons ranging from BTEX to crude oil, sheen, chlorinated solvents, PCBs, organic solvents, pesticides & biocides, and organically bound metals from wastewater. Preferably, this type of treatment material 31 is that which is commercially available under the tradename MYCELX from MYCELX Technologies Corporation of Gainesville, Ga. MYCELX chemistry is infused into a filter media that has been optimized for the water stream being treated. The treated MYCELX filter media instantly bonds with the targeted pollutants on contact removing 99+% from the water in a single pass. MYCELX filter media is effective on both semi-soluble or insoluble pollutants preventing the captured contamination from separating, emulsifying, or releasing once contained.

Figure 2:
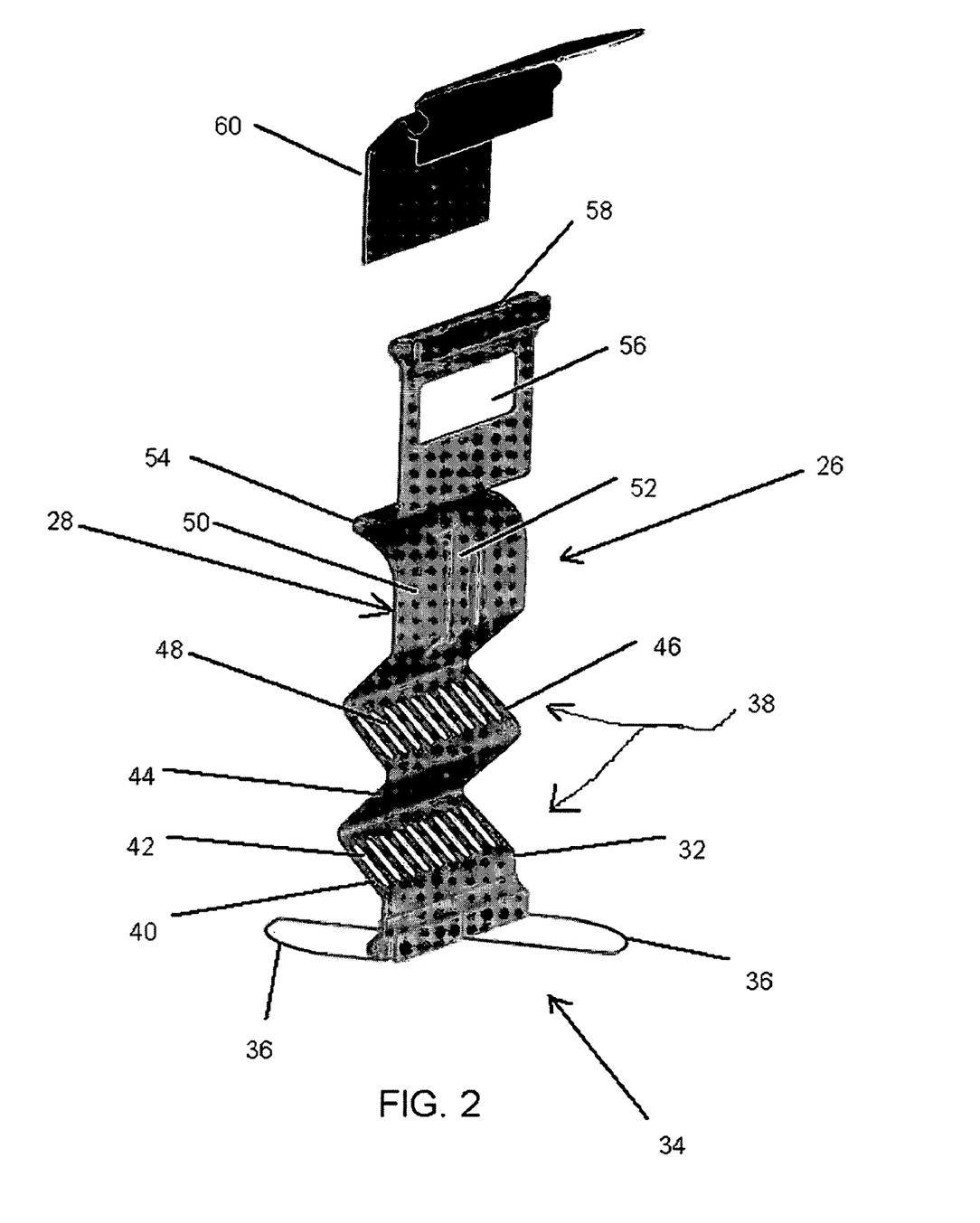
FIG. 2 is an exploded view of the storm water treatment insert that is depicted in FIG. 1.

Referring now to FIG. 2, which depicts insert 26 in greater detail, it will be seen that insert 26 includes a baffle member 28 that is constructed and arranged to be secured in a substantially vertical position within the storm water drain basin 10 and to seal against the interior of the sidewall 12 of the storm water drain basin 10 so as to effectively partition the space within the drain basin 10 and to the first and second compartments 27, 29 described above. Baffle member 28 includes an upper portion 30 and a lower portion 32 that is adapted to be positioned securely against the bottom 18 of the storm water drain basin 10. Lower portion 32 preferably includes base positioning structure 34 that is configured in the preferred embodiment as a pair of resilient metallic arms 36 that are constructed and arranged to securely seat against the interior of the lowermost end of the sidewall 12 of the drain basin 10.

A primary flowpath 38 from the first compartment 27 to the second compartment 29 is defined in the lower portion 32 of the baffle member 28 in such a manner that storm water within the first compartment 27 is induced to flow upwardly within the second compartment 29 through the cartridges 90 and the treatment material 31. As is shown in FIG. 2, the lower portion 32 of baffle member 28 includes a first surface 40 that slopes downwardly and inwardly toward the second compartment 29, a second surface 44 that slopes upwardly and inwardly and a third surface 46 that slopes downwardly and inwardly toward the second compartment 29. A plurality of small holes 42 that are defined in the first surface 40 and a corresponding plurality of small holes 48 that are defined in the third surface 46 together define the primary flowpath 38 described above. Preferably, first surface 40 is elevated slightly with respect to the bottom of the baffle member 26 so as to create a sedimentation space at the very bottom of the first compartment 27.

Figure 3:
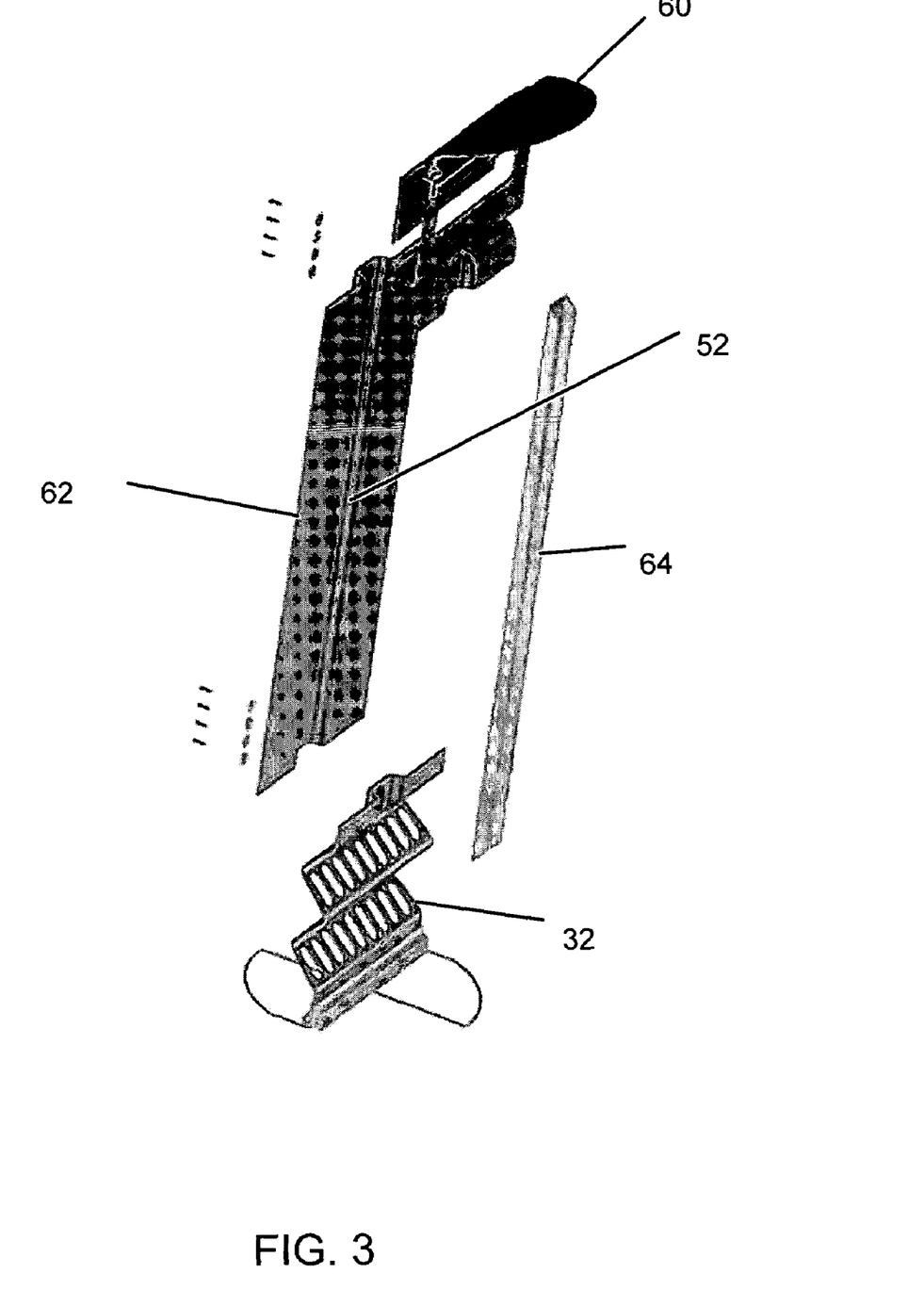
FIG. 3 is an exploded perspective view of an insert that is constructed according to a slightly modified embodiment of the invention.

Baffle member 28 further includes a riser portion 50 positioned above the lower portion 32, the length of which may be varied as is depicted in FIG. 3 in order to match the length of the storm water drain basin 10. As FIG. 3 shows, an extended riser 62 may be secured to the lower portion 32 in order to increase the overall length of the vertically oriented baffle member 28. Both the standard riser 50 and the extended riser 62 have a longitudinal recess 52 defined therein in order to accommodate a longitudinally extending reinforcing element 64, which is also shown in FIG. 3.

Figure 4:
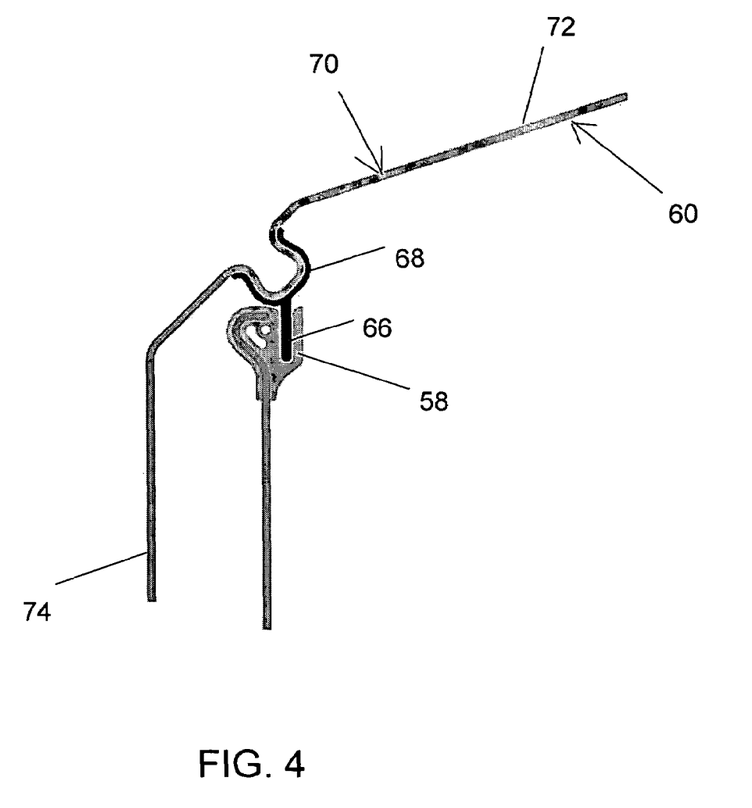
FIG. 4 is a cross-sectional view depicting mounting details of a deflector that is mounted upon the insert.

According to another important aspect of the invention, a deflector member 60 is preferably removably mounted to a mounting track 58 that is provided at the uppermost edge of the upper portion 30 of the baffle member 28. As is best shown in FIG. 4, deflector member 60 includes a mounting bracket 68 having a downwardly depending tongue 66 that fits within a mating recess that is defined in the mounting track 58. In order to remove the deflector member 60 from the baffle member 28, the deflector member 60 is simply lifted upwardly. Deflector member 60 preferably includes a shield 70 having a cover portion 72 that sufficiently covers the second compartment 29 so that storm water entering the open upper end 20 of the storm water drain basin 10 will be directed into the first compartment 27 and prevented from directly entering the second compartment 29. Cover portion 72 further preferably includes a downwardly depending apron 74 that directs falling storm water toward a shoulder portion 54 of the baffle member 28, which further deflects the storm water into the first compartment 27 in a direction that is away from the primary flowpath 38. In addition, the apron 74 preferably extends beneath the overflow bypass opening 56 to ensure that floatables within the first compartment 27 will be retained within the first compartment when a major flooding event occurs that requires utilization of the overflow bypass.

Figure 5:
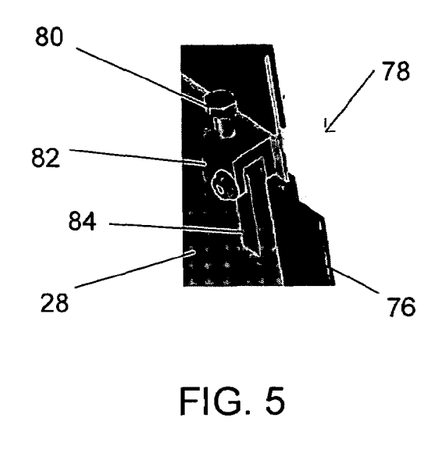
FIG. 5 is a fragmentary perspective view of a clamping mechanism that is used to secure the insert to a storm water drain basin, shown in a first operational position.
Figure 6:
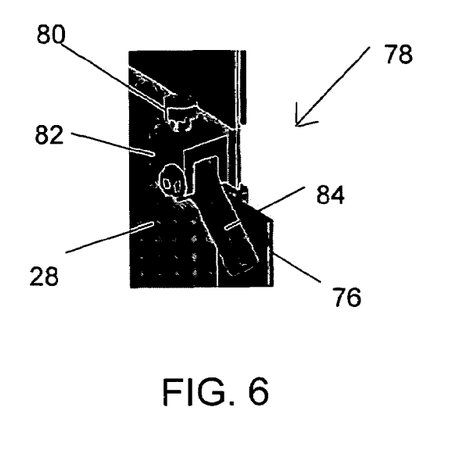
FIG. 6 is a fragmentary perspective view similar to that provided in FIG. 6, showing the clamping mechanism in a second operational position.

As is best shown in FIG. 5 and FIG. 6, the outer edges of the baffle member 28 includes structure for forming a relatively tight seal against the inner surface of the sidewall 12 of the storm water drain basin 10. In the preferred embodiment, the sealing structure is embodied as a number of flexible wipers 76 that extend laterally outwardly from the side edge of the baffle member 28. Baffle member 28 is preferably fabricated from a polymeric material such as polypropylene. Flexible wipers 76 are preferably fabricated from a more resilient rubber-like polymeric material, such as EPDM sponge rubber, neoprene or the like.

Figure 7:
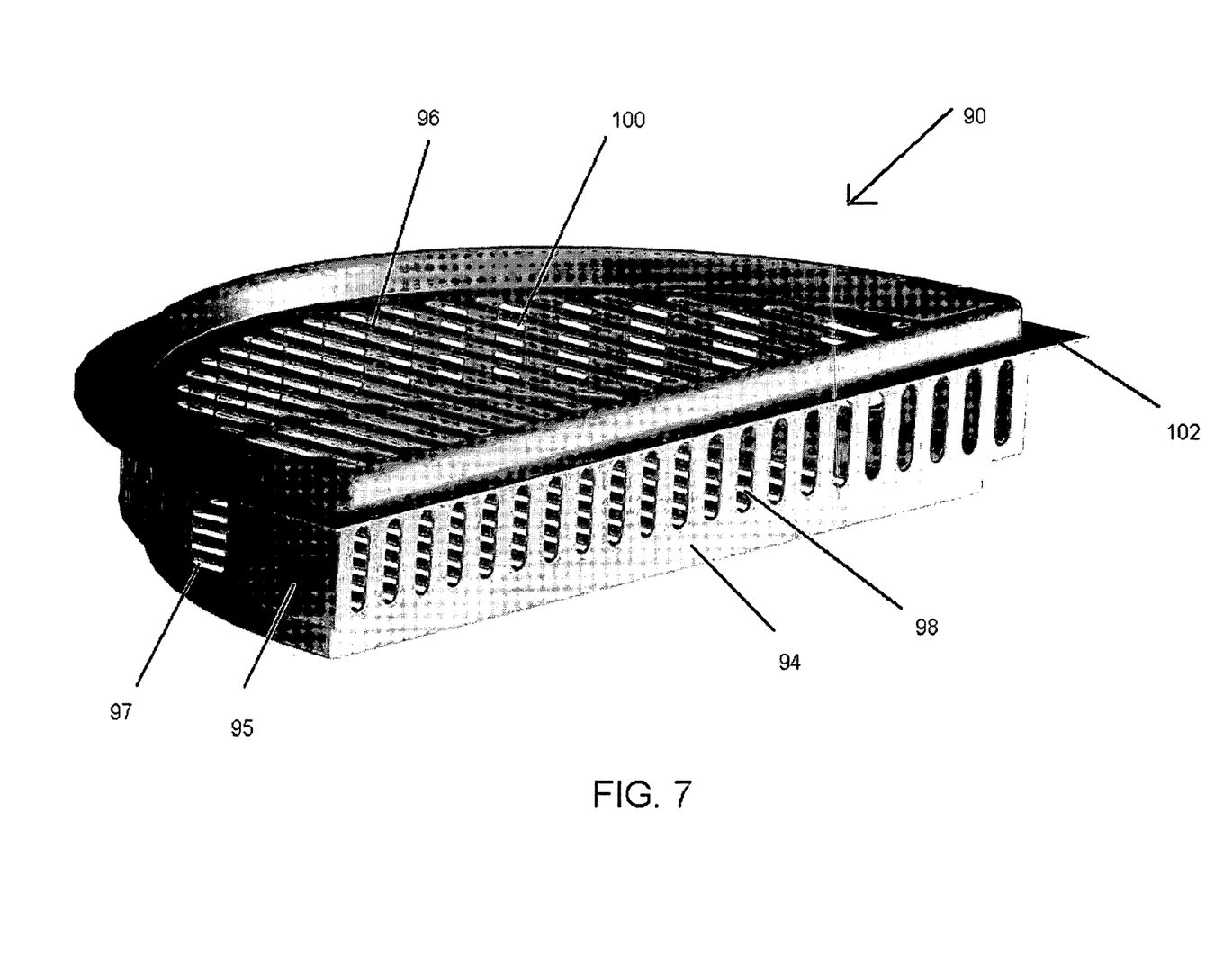
FIG. 7 is a perspective view of a cartridge that is configured for use with the present invention.

Looking again to FIGS. 5 and 6, it will be seen that the storm water treatment insert 26 is preferably provided with a mechanical clamping system 78 in order to securely mount the baffle member 28 within the storm water drain basin 10. Mechanical clamping system 78 includes an adjustment bolt 80 that is threaded into a bracket 82. A lever 84 is pivotally mounted with respect to the bracket 82 and is oriented with respect to the adjustment bolt 80 so that advancement of the adjustment bolt 80 with respect to the bracket 82 will cam the lever 84 from the first, retracted position depicted in FIG. 6 to the second, extended position that is shown in FIG. 7. In the second, extended position lever 84 will engage the sidewall 12 of the storm water drain basin 10, thereby securing the baffle member 28 in position relative to the storm water drain basin 10.

Figure 8:
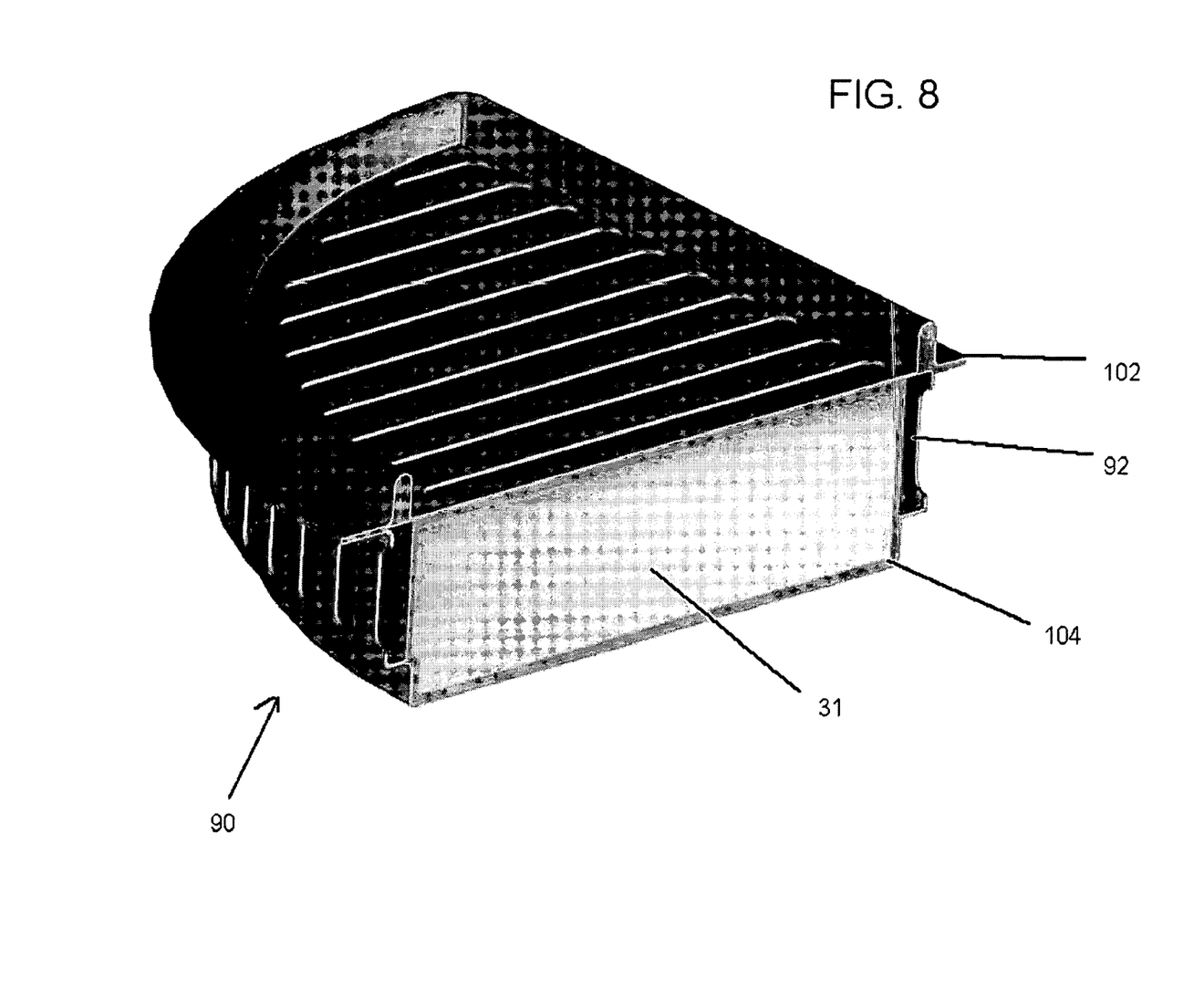
FIG. 8 is a cross-sectional view through the cartridge that is depicted in FIG. 7.

A cartridge 90 is illustrated in FIG. 7. Cartridge 90 includes a relatively rigid outer casing 92 having a relatively flat side surface 94, a convex side surface 95 a top surface 96 and a bottom surface 97. A plurality of perforations 98 are defined in the relatively flat side surface 94, and a plurality of perforations 100 are defined in the top surface 96. Similar perforations are preferably defined in the convex side surface 95 and the bottom surface 97. The treatment material 31 is preferably contained within the interior of the cartridge 90 by a permeable fabric such as woven geotextile fabric 104, as is better shown in FIG. 8. In manufacturing, recycled polymer fibers are converted into a lightweight, fibrous blanket having enormous surface area and microscopic interstitial spaces. The fibers are lipophilic; in other words they have a selective affinity for hydrocarbons such as fuel residues, oils and other petroleum products. When used as a filter medium, water passes freely through the blanket, while adsorption of targeted hydrocarbons begins on contact. The woven pads can adsorb up to 10 times their own weight in oils, greases and other toxic chemicals. Importantly, hydrocarbons adhere to the woven material even through extended dry periods and are not displaced by subsequent storm events.

Cartridge 90 is further preferably provided with a relatively flexible sealing gasket 102 that is adapted to seal against the baffle member 28 so that storm water entering the second compartment 29 via the primary flowpath 38 will be directed into the cartridge 90 rather than between the cartridge 90 and the baffle member 28. This ensures that the storm water that flows through the primary flowpath 38 will be processed by the treatment material 31 that is contained within the cartridge 90. Cartridge 90 is preferably configured so as to be stackable, as is shown in FIG. 1. The modular nature of the cartridge 90 permits different types of treatment material to be placed within the second compartment 29 for treating the storm water flowing therethrough. For example, a first cartridge 90 may be filled with a first type of zeolite, while a second cartridge 90 may be provided with a second type of zeolite that has a slightly different remediation function from the first type of zeolite.

In use, a storm water treatment insert 26 according to the invention may conveniently be retrofitted to an existing storm water drain basin 10 by removing the cover 22 of the storm water drain basin 10 and inserting the insert 26 downwardly into the storm water drain basin 10 with a rotational orientation, shown in FIG. 1, that will ensure that the first compartment 27 will be in communication with the inlet 14 of the storm water drain basin 10 and the second compartment 29 will be in communication with the outlet 16. The base positioning structure 34 will be securely seated against the bottom 18 of the storm water drain basin 10, with the flexible wiper element 76 forming a seal against the interior sidewall 12. When the baffle member 28 is properly positioned, adjustment bolts 80 are tightened, clamping the lever members 84 against the interior sidewall 12. At this point, the cartridges 90 are positioned in the predetermined location at the bottom of the second compartment 29, shown in FIG. 1. The deflector member 60 is then mounted on to the mounting track 58 at the uppermost end of the baffle member 28.

As storm water flows through the drain basin 10, the presence of the baffle member 28 acts to keep various debris and floatables contained within the first compartment 27, where they may be periodically retrieved by service personnel who will access the storm water drainage basin 10 by removing the cover 22. Such periodic servicing will also include removal and replacement of the treatment material 31. In the preferred embodiment of the invention, this will include a first step of removing the used cartridges 90 and a second step of replacing the used cartridges with new cartridges. In an alternative embodiment of the invention, the treatment material 31 may be provided within containment bags or other convenient structure in lieu of the cartridges 90. With such an embodiment, periodic servicing will involve removing the containment bags and replacing them with new containment bags containing fresh treatment material 31.

In the event that a major storm creates an excess of storm water that is too large to be effectively process through the primary flowpath 38, excess storm water will be permitted to flow through the overflow aperture that is defined in the upper portion 30 of the baffle member 28.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of processing storm water, comprising:
    accessing a drain basin that is part of an existing functional storm water runoff system;
    positioning a treatment system within said drain basin that is constructed and arranged to remediate contamination of storm water within said drain basin;
    wherein said step of positioning a treatment system within said drain basin comprises separating a space within said drain basin into at least a first compartment and a second compartment, said first compartment being in communication with an inlet opening that is defined in a sidewall of the drain basin and said second compartment being in communication with an outlet opening that is defined in said sidewall;
    wherein said step of positioning a treatment system further includes positioning a treatment material within said second compartment;
    wherein said step of positioning a treatment material within said second compartment comprises positioning at least one cartridge containing said treatment material within said second compartment; and
    wherein said step of positioning at least one cartridge comprises forming a seal between said cartridge and a surface defining a boundary of said second compartment.

2. A method of processing storm water according to claim 1, wherein said step of separating a space within said drain basin comprises installing a substantially vertical baffle member within said drain basin.

3. A method of processing storm water according to claim 1, further comprising a step of accessing said first compartment and removing debris from said first compartment.

4. A method of processing storm water according to claim 3, wherein said step of accessing said first compartment is performed by removing a cover that is mounted to an upper end of said drain basin.

5. A method of processing storm water according to claim 1, wherein said step of positioning at least one cartridge comprises stacking more than one cartridge within said second compartment.

6. A method of processing storm water according to claim 5, wherein a first of said cartridges contains a first treatment material and wherein a second of said cartridges includes a second, different treatment material.

* * * * *